US008195749B2

(12) United States Patent
Rao

(10) Patent No.: US 8,195,749 B2
(45) Date of Patent: Jun. 5, 2012

(54) QUESTIONNAIRE SERVER CAPABLE OF PROVIDING QUESTIONNAIRES BASED ON DEVICE CAPABILITIES

(76) Inventor: Bindu Rama Rao, Laguna Niguel, CA (US)

( * ) Notice: Subject to any disclaimer, the term of this patent is extended or adjusted under 35 U.S.C. 154(b) by 753 days.

(21) Appl. No.: 11/807,672

(22) Filed: May 30, 2007

(65) Prior Publication Data
US 2008/0114845 A1 May 15, 2008

Related U.S. Application Data

(60) Provisional application No. 60/858,546, filed on Nov. 13, 2006.

(51) Int. Cl.
*G06F 15/16* (2006.01)
(52) U.S. Cl. ......................................... 709/206; 709/224
(58) Field of Classification Search .................. None
See application file for complete search history.

(56) References Cited

U.S. PATENT DOCUMENTS

| | | | | | |
|---|---|---|---|---|---|
| 5,870,454 | A  * | 2/1999 | Dahlen | ...... | 379/88.14 |
| 6,161,458 | A  * | 12/2000 | Spatafora | ...... | 83/13 |
| 6,175,822 | B1 * | 1/2001 | Jones | ...... | 704/270 |
| 6,302,698 | B1 * | 10/2001 | Ziv-El | ...... | 434/323 |
| 6,430,624 | B1 * | 8/2002 | Jamtgaard et al. | ...... | 709/246 |
| 6,501,779 | B1 * | 12/2002 | McLaughlin et al. | ...... | 372/52 |
| 6,513,014 | B1 * | 1/2003 | Walker et al. | ...... | 705/7.32 |
| 6,801,931 | B1 * | 10/2004 | Ramesh et al. | ...... | 709/206 |
| 6,819,669 | B2 * | 11/2004 | Rooney | ...... | 370/390 |
| 6,873,688 | B1 * | 3/2005 | Aarnio | ...... | 379/92.02 |
| 7,020,685 | B1 * | 3/2006 | Chen et al. | ...... | 709/204 |
| 7,032,030 | B1 * | 4/2006 | Codignotto | ...... | 709/246 |
| 7,096,464 | B1 * | 8/2006 | Weinmann | ...... | 717/169 |
| 7,261,239 | B2 * | 8/2007 | Rao | ...... | 235/472.01 |
| 7,418,472 | B2 * | 8/2008 | Shoemaker et al. | ...... | 709/203 |
| 7,434,050 | B2 * | 10/2008 | Jeffries et al. | ...... | 713/169 |
| 7,444,380 | B1 * | 10/2008 | Diamond | ...... | 709/206 |
| 2001/0044327 | A1 * | 11/2001 | Kanefsky | ...... | 455/566 |
| 2002/0016818 | A1 * | 2/2002 | Kirani et al. | ...... | 709/203 |
| 2002/0070961 | A1 * | 6/2002 | Xu et al. | ...... | 345/738 |
| 2002/0071528 | A1 * | 6/2002 | Kumamoto | ...... | 379/88.12 |
| 2002/0138462 | A1 * | 9/2002 | Ricketts | ...... | 707/1 |
| 2002/0143975 | A1 * | 10/2002 | Kimura et al. | ...... | 709/231 |
| 2003/0088452 | A1 * | 5/2003 | Kelly | ...... | 705/10 |
| 2003/0163527 | A1 * | 8/2003 | Hsu | ...... | 709/204 |
| 2003/0229533 | A1 * | 12/2003 | Mack et al. | ...... | 705/10 |
| 2004/0043372 | A1 * | 3/2004 | Jebb et al. | ...... | 434/322 |
| 2004/0058694 | A1 * | 3/2004 | Mendiola et al. | ...... | 455/466 |
| 2004/0082346 | A1 * | 4/2004 | Skytt et al. | ...... | 455/456.3 |
| 2004/0139232 | A1 * | 7/2004 | Giannetti et al. | ...... | 709/246 |
| 2004/0193683 | A1 * | 9/2004 | Blumofe | ...... | 709/204 |
| 2004/0244037 | A1 * | 12/2004 | Yamaguchi et al. | ...... | 725/37 |
| 2004/0252814 | A1 * | 12/2004 | Eakin | ...... | 379/88.17 |
| 2005/0010651 | A1 * | 1/2005 | Xu et al. | ...... | 709/219 |

(Continued)

*Primary Examiner* — Ian N Moore
*Assistant Examiner* — Dung B Huynh
(74) *Attorney, Agent, or Firm* — McAndrews, Held & Malloy, Ltd.

(57) ABSTRACT

A mobile device or a sender's PC, notebook, PDA or laptop creates questionnaires and sends it to other recipient devices. The questionnaire is created by user of mobile device using audio inputs for a questionnaire preamble and for preambles for a question. A server in the network incorporates other generic portions of the questionnaire. It collates results received and send it to user who made/sent the questionnaire. Thus, a user can make adhoc questionnaires, send them to recipients and receive the results. This makes it easy for a user to create, disseminate, conduct questionnaires or surveys on mobile handsets and to collect results for processing and storage.

17 Claims, 14 Drawing Sheets

U.S. PATENT DOCUMENTS

| | | | | |
|---|---|---|---|---|
| 2005/0132192 | A1* | 6/2005 | Jeffries et al. | 713/169 |
| 2005/0150943 | A1* | 7/2005 | Rao | 235/375 |
| 2005/0223068 | A1* | 10/2005 | Shohfi et al. | 709/206 |
| 2005/0251749 | A1* | 11/2005 | Lamkin et al. | 715/719 |
| 2005/0262540 | A1* | 11/2005 | Swix et al. | 725/90 |
| 2006/0059174 | A1* | 3/2006 | Mese et al. | 707/100 |
| 2006/0123082 | A1* | 6/2006 | Digate et al. | 709/205 |
| 2006/0194185 | A1* | 8/2006 | Goldberg et al. | 434/350 |
| 2006/0242687 | A1* | 10/2006 | Thione et al. | 726/4 |
| 2006/0259866 | A1* | 11/2006 | Prasad et al. | 715/747 |
| 2006/0294186 | A1* | 12/2006 | Nguyen et al. | 709/204 |
| 2007/0036282 | A1* | 2/2007 | Engelke et al. | 379/52 |
| 2007/0050256 | A1* | 3/2007 | Walker et al. | 705/14 |
| 2007/0099636 | A1* | 5/2007 | Roth | 455/466 |
| 2007/0101358 | A1* | 5/2007 | Ambady | 725/31 |
| 2007/0121846 | A1* | 5/2007 | Altberg et al. | 379/114.13 |
| 2007/0130463 | A1* | 6/2007 | Law et al. | 713/168 |
| 2007/0155411 | A1* | 7/2007 | Morrison | 455/466 |
| 2007/0162566 | A1* | 7/2007 | Desai et al. | 709/219 |
| 2007/0245365 | A1* | 10/2007 | Mitsui | 725/13 |
| 2007/0294354 | A1* | 12/2007 | Sylvain | 709/206 |
| 2008/0005341 | A1* | 1/2008 | Subbian | 709/229 |
| 2008/0069120 | A1* | 3/2008 | Thomas | 370/401 |
| 2008/0072139 | A1* | 3/2008 | Salinas et al. | 715/238 |
| 2008/0269636 | A1* | 10/2008 | Burrows et al. | 600/559 |
| 2008/0301231 | A1* | 12/2008 | Mehta et al. | 709/204 |
| 2009/0119700 | A1* | 5/2009 | Sansom | 725/31 |

* cited by examiner

QUESTIONNAIRE SERVER CAPABLE OF PROVIDING QUESTIONNAIRES BASED ON DEVICE CAPABILITIES

CROSS REFERENCES TO RELATED APPLICATIONS

The present application makes reference to, claims priority to, and claims benefit of U.S. Provisional Application Ser. No. 60/858,546 entitled QUESTIONNAIRE SERVER CAPABLE OF PROVIDING QUESTIONNAIRES BASED ON DEVICE CAPABILITIES filed on Nov. 13, 2006, the complete subject matter of which is hereby incorporated herein by reference, in its entirety.

This patent application makes reference to U.S. provisional patent entitled "QUESTIONNAIRE CLIENT FOR MOBILE DEVICE", filed on Oct. 4, 2006, 60/849,715. The complete subject matter of the above-referenced U.S. patent application is hereby incorporated herein by reference, in its entirety.

This patent application makes reference to U.S. provisional patent entitled "MOBILE DEVICE FOR CREATING ADHOC QUESTIONNAIRE", filed on Oct. 7, 2006, 60/850,084. The complete subject matter of the above-referenced U.S. patent application is hereby incorporated herein by reference, in its entirety.

This patent application makes reference to U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced U.S. Provisional patent application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced U.S. patent application is hereby incorporated herein by reference, in its entirety.

BACKGROUND

1. Technical Field

The present invention relates generally to the interactions between mobile handset and it's a server within a network, and more specifically to the ability to create questionnaires using a mobile handset, store them in a network, disseminate them and collect results.

2. Related Art

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry, and only brief user inputs can be solicited from a user without annoying the user.

Often a user would want to ask his friend which movie from a selection of movies currently playing that they want to see. A user has to cumbersomely call up each of his friends and repeat the same questions, talk about movies currently showing, and ask them which one they would want to see in a group today. The whole process is time consuming, expensive, and requires all his friends to be available for the conversation to be satisfactorily completed.

User interaction in real time, such as those provided for a user using a PC on the Internet, are often not possible for a user using a cell phone. For example, the amount of textual information cannot be a full page of textual information that is typically made available o a PC. Graphical information also cannot be large. A typical website provides a rich multi-media experience. The same website, when accessed from a cell phone, would not only be unreadable, due to its large amount of text, graphics and even video, but also frustrating due to the nature of web sites—the design of websites often being multi-media based (predominantly providing large multi-media web pages full of text, graphics, flash-based and even containing videos). Thus, there is a problem in presenting a mobile user with information in order to solicit user input when the user is using a cell phone. Soliciting user input from a user when the user is using a cell phone, rather than a PC, is a big problem.

Cell phones are therefore a device for which traditional websites are ill prepared to provide information. In addition, surveys or questionnaires that are created for Internet based access via a PC are not appropriate for cell phone access. Asking one or more detailed questions with information on how to answer them is possible on a web page that is accessed from a PC. However, the same web page would be unmanageable and difficult to browse and navigate on a cell phone with a small LCD screen and small keyboard for user input.

Quite often a user of a mobile device would like to determine where his friends would like to have dinner among all the nearby restaurants. The user may have to call each and every one of his interested friends to determine their preferences, in order to determine which restaurant would be the preferred one. This would take at least as many calls as the number of interested friends, and would take the same amount of time for each such call, and incur significant costs to the user. There does not exist an easy way for a user to send questionnaires from his mobile device, especially optimizing on the ability of the user to employ voice on the mobile device.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
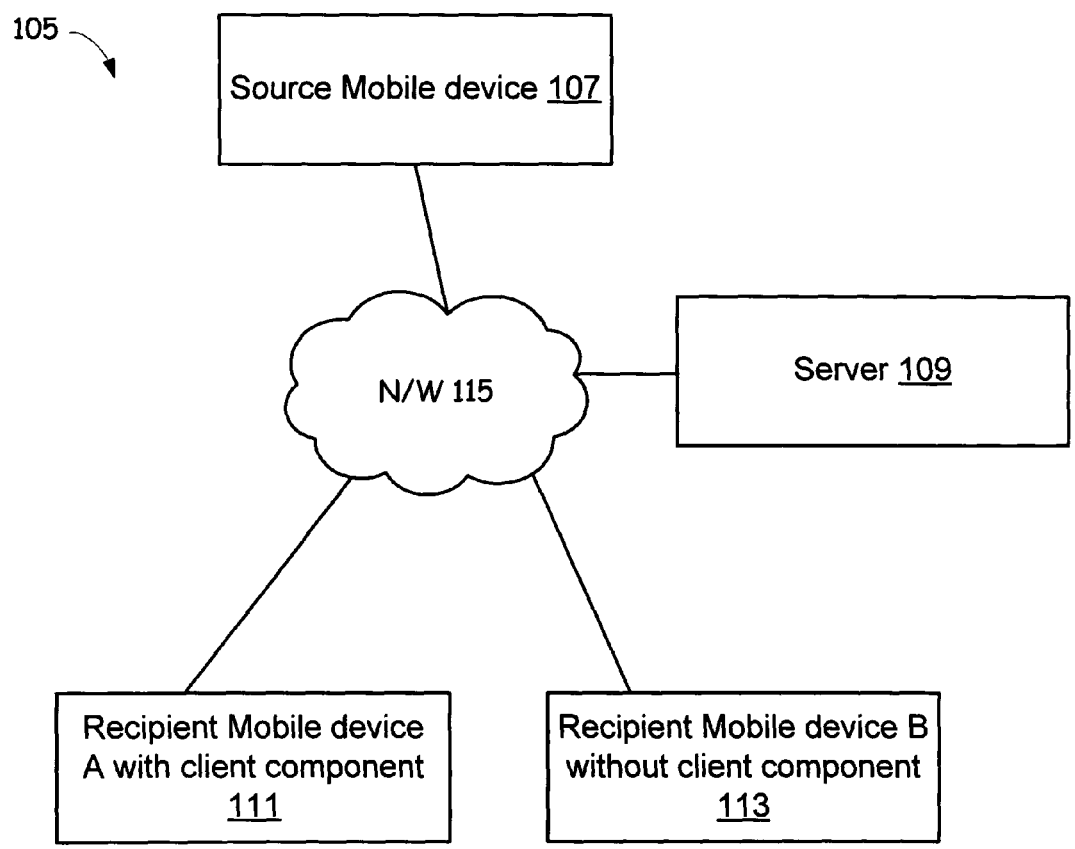
FIG. 1 is a perspective block diagram of a network for mobile devices that facilitates creation and dissemination of questionnaires from a source mobile device to a plurality of other recipient mobile devices.

FIG. 1 is a perspective block diagram of a network 105 for mobile devices that facilitates creation and dissemination of questionnaires from a source mobile device 107 to a plurality of other recipient mobile devices 111, 113, wherein the questionnaire is disseminated to the recipient mobile devices in a form that is compatible with the capabilities of the respective recipient mobile devices 111, 113. The network 105 comprises the source mobile device 107, the plurality of other recipient mobile devices 111, 113 and a server 109. Some of the plurality of other recipient mobile devices 111, 113 are legacy devices that do not have a client component capable of handling the download and display of questionnaires. Others of the plurality of other recipient mobile devices 111, 113 have the client component capable of handling the download and display of questionnaires. The server 109 determines which recipient mobile device can handle questionnaires (because they comprise the client component capable of handling questionnaires), and which need to be sent a simpler subset of the questionnaire that can be displayed/rendered without the client component.

The source mobile device 107 captures questions (in audio form) from a user and sends it to a server 109 to convert it into a complete questionnaire that is sent to designated recipients. The recipients use their respective recipient mobile devices 111, 113 for browsing through the questionnaire when they receive it. They can use the client component if it is present for such browsing. Alternatively, they can use a browser (such as a WAP browser) to browse through the questionnaire. The server 109 receives the results from the recipient devices 111, 113 and forwards them to the source mobile device 107.

The server 109 receives ad hoc questions from the source mobile device 107, adds boilerplate text (such as multiple choices), determines which of the recipient mobile devices specified, such as recipient mobile devices 111 and 113, can handle the all the contents of the questionnaire (audio components, textual components, graphics if any, video is any), and which need to be sent a simpler subset of the questionnaire, such as only text, or only audio components of the questionnaire.

The server 109 is capable of converting recipient list to a list of phone numbers or IP addresses as needed, in order to communicate the questionnaires, or a notification regarding the questionnaire, to the recipient mobile devices 111, 113. In order to play all the components of a questionnaire, if required, the recipient devices, such as the recipient device 111, have a client component that can handle all the components of a questionnaire, audio, textual, graphics and even video components). In one embodiment the client component that can only handle the components of a questionnaire such as audio and textual. In order to play all the components of a questionnaire, if required, the recipient devices, such as the recipient device 113, do not have a client component. Instead, the server 109 makes it possible for them to participate in the questionnaire by sending them the same questionnaire in an alternate form, such as a simplified set of web pages, that the recipient client device 113 can display using a browser or some other existing client in the recipient mobile device 113. In addition, the recipient client device 113 will be sent a notification regarding the questionnaire that also comprises a link that can be activated to download the client component so that it could be installed before displaying the questionnaire.

The recipient mobile device 113 without client component gets an opportunity to download & install the necessary client component. The user can then activate the download link whereupon the client component is downloaded and installed automatically (or with user optin). The user of the recipient mobile device 113 also is given the option, selectively, to receive a subset of questionnaire that recipient mobile device 113 can handle without the client component.

The recipient mobile device 111 with the client component receives question/questionnaire, lets user browse through each question and answer them, and sends results to the server 109. It is able to play/render/display all portions of a questionnaire that may be provided, such as audio, text, graphics, video, etc.

The server 109 is capable of completing the incomplete questionnaires received from the source mobile device 107 or from a PC/computer (not shown) or another server (not shown). For example, the source mobile device 107 may send an incomplete questionnaire with two questions, each with only the audio preamble created (by a user recording the questions in audio form that incorporates a brief descriptions of available choices) and the server 109 incorporates a generic textual preamble and a generic set of multiple choices for each question in order to complete the questionnaire. For example, if the user creating the questionnaire on the source mobile device 107 provided two questions such as "Which movie do you want to go? a) jaws b) sideways c) room with a view" and "Where do you want to eat after the movie? a) Freds, b) Baja Fresh c) That This", then the server 109 would incorporate into the received partially complete questionnaire a generic textual preamble (also called prompt sometimes), such as "Select one of the following", and a generic multiple choice set, such as ">A, >B, >C", for each question received in the questionnaire. The server then is capable of determining if a recipient device can only handle a subset of the questionnaire, such as only the textual component), and sends it to such recipient devices. In one embodiment, the server transcribes the audio components into textual components and sends those transcribed text along with the other boilerplate text to recipients who cannot handle audio components of a questionnaire. Thus, for example, spoken preambles and supplementary information, in a questionnaire can be converted into equivalent textual components by the server 109, in an automated way, so that devices that cannot handle audio preambles and audio supplementary information (or video preambles and video supplementary information) can be provided with equivalent and/or relevant textual components.

In one embodiment, the server 109, based on device capability (or lack of capability), incorporates the use of an IVR system, as required (for example during a supplementary information requested, or a preamble to be played) during the attempt by a recipient user on a recipient device, such as a recipient device without the client component 113, to respond to the questions of a questionnaire.

The server 109 receives audio question from a user, incorporates multiple-choice text, and generic prompt to user, and sends questionnaire to recipients. The recipients are either specified by the user along with the questionnaire or pre-configured and stored in the server 109 to be used to forward questionnaires. It then receives responses, and sends them to source mobile device 107. Responses are either sent individually as they are received or collated and sent in one set back to the source mobile device 107. Additionally, it is possible to configure the server 109 to save the responses until they are retrieved by the source mobile device 107.

The server 109 also supports the notification of the availability of the questionnaire and the dissemination of questionnaires to the mobile device 111. The user interaction is facilitated by a client component in the mobile device 111, which is either made available by the manufacturer of the mobile handsets or subsequently downloaded over the air, or otherwise installed by the user. The client component is able to process the received questionnaire (or portions thereof), playing audio portions such as audio preambles, audio supplementary information, etc. and displaying textual preambles and textual multiple-choice sets.

In one embodiment, the network 105 comprises mobile devices 107, 111, 113 which are a combination of cellular phones, PDAs, etc. and the network is 115 is a wireless and/or wired network, cellular network such as 3G, UMTS, CMDA, GSM, etc., a WLAN network, or a WiMAX network, Internet, Bluetooth, IrDA, etc.

Figure 2:
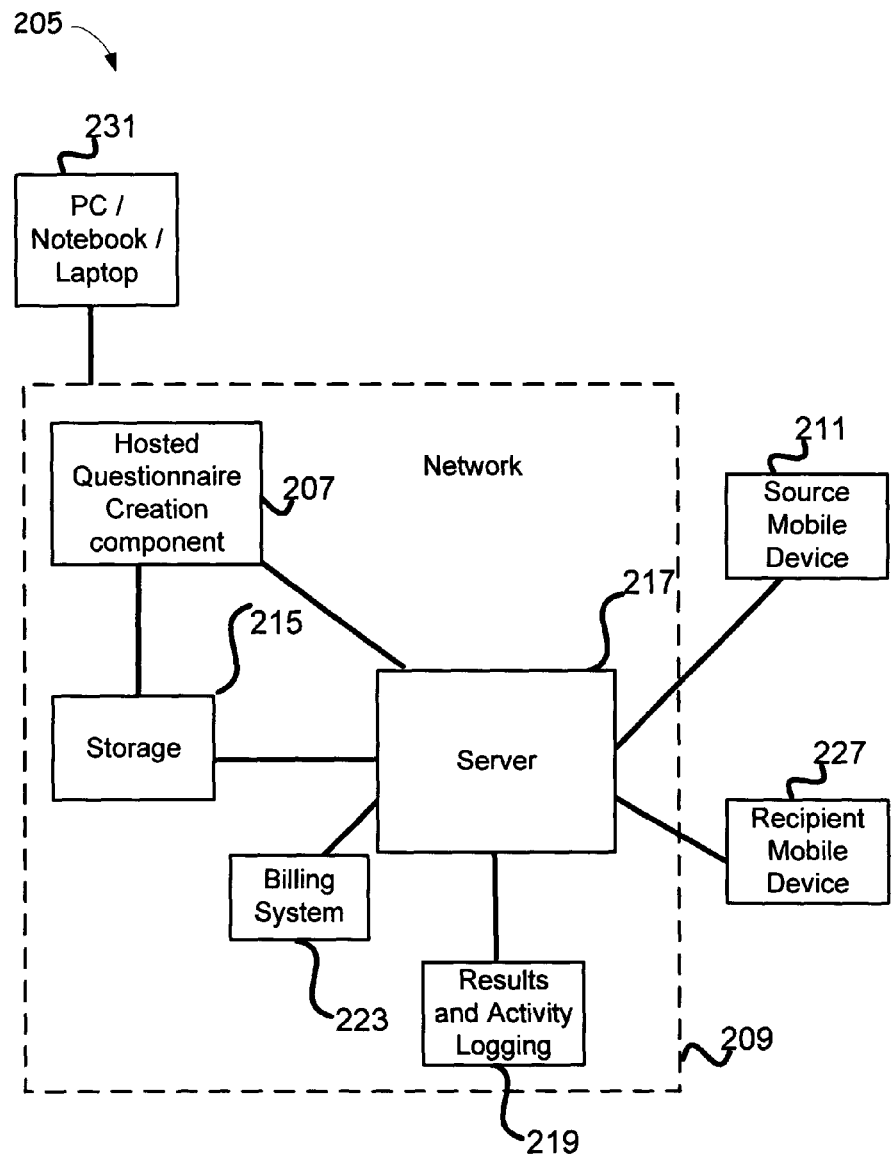
FIG. 2 is a perspective block diagram of a network that supports adhoc questionnaire creation by a user of a mobile device that is forwarded to recipient users who respond to the questionnaire and the results are routed back to the mobile device.

FIG. 2 is a perspective block diagram of a network 205 that supports adhoc questionnaire creation, using a PC/computer 231 or a source mobile device 211, by a user, that is forwarded to recipient users who respond to the questionnaire, and the results are routed back to the user to his PC/computer 231 or the source mobile device 211. The network 205 comprises the source mobile device 211 that a user uses to create adhoc questionnaires, a server that receives the questionnaires and sends them to one or more recipient mobile devices 227, a questionnaire creation component 207 that facilitates questionnaire creation using the PC/laptop/computer, or via web pages provided by the server 217. The network 205 also comprises a storage 215 that is used to store questionnaires if necessary, and a results and activity logging component 219 that can be used to track questionnaire creation, questionnaire answering, and other related activities. In addition, the network 205 comprises a billing system 223 that can facilitate billing for the creation of questionnaires, the distribution of questionnaires, etc.

Questionnaire creation (or even a single ad hoc question creation) is supported in source mobile device 211. The ad hoc questionnaires can also be created using the PC/notebook/laptop 231 and uploaded to the server 217. In addition, the /notebook/laptop 231 can be used to access the hosted questionnaire creation component 207, to create detailed questionnaires across multiple login sessions or simple ad hoc questionnaires that only provide audio components (with boilerplates to be inserted), etc.

A user with client component in source mobile device 211 creates an ad-hoc question/questionnaire on the fly, and sends the audio question(s) to recipients specified using a pre-created mailing list (or selecting recipients from a address book, or other sources on the source mobile device 211). The user receives responses such as multiple choice selects (A, B, C or D) from one or more recipients.

The user can also employ a /notebook/laptop 231 communicatively coupled to a hosted questionnaire creator tool 207 to create ad-hoc questionnaires with only audio inputs provided, ad-hoc queries with only 1 textual question preamble provided, or even complete questionnaires with audio and textual preambles, supplementary information in audio and textual formats (even graphics and video formats).

The server 217 would do the rest when a user provides ad hoc questions/questionnaires (with more than one question)—formulating the rest of the question such as generic preamble and multiple-choices (such as using boilerplate text) based on audio input (which is called Question preamble) when no other information is provided. The client component in the source mobile device 211 communicates a complete or partially complete questionnaire to the server 217 with a recipient list. The server 217 farms out question to recipient(s), such as the recipient user of the recipient mobile device 227, and the form of questionnaire sent is based on device capabilities, or user initiated mode of questionnaire browsing—the recipient user can choose to use browser to browse through and respond to questionnaire, or employ the client component to retrieve the questionnaire and respond to it, etc. The server 217 receives responses from the recipients and forwards result to user on source mobile device 211, or the user employing a PC/notebook/laptop 231. The server 217 can also send the questionnaire (or a link to a hosted version of the questionnaire to be responded by a browser) to other users who have a PC/notebook/laptop 231. In one embodiment, the recipients for a questionnaire are a combination of PC users, laptop users, PDA users, users of mobile devices, set-top-box TVs, TVs, writable tablets, etc Responses can be collated if the user so desires, and reported back to the user by the server 217. The user can receive responses on email, on website (on subsequent visit to a hosted webpage), on source mobile device 211 (for example, the user needs to specify mobile number of mobile device on which the user wishes to receive the responses), by SMS messages, by instant messaging, etc.

Ad hoc questionnaire creation (a single question creation is also supported) in thus possible using the source mobile device 211. The source mobile device comprises a client component that supports questionnaire creation (even a partial questionnaire that can later be completed by the server 217). A user with the client in the source mobile device 211 creates an ad-hoc question/questionnaire on the fly and sends audio question to specific recipients or to a pre-configured recipient list or mailing-list, and receives responses (such as one of a multiple-choice A, B, C or D for each question) from one or more recipients. The user of the source mobile device 211 does the following to create a questionnaire and receive results:

a) Activates recording on source mobile device 211 (such as activating a record button on the source mobile device 211, a different button, or displayed menu item)

b) User speaks into source mobile device 211 c) User stops recording a question d) User records audio component for additional questions if needed, repeating steps a) through c)

e) User terminates audio inputs for adhoc questionnaire d) User provide recipient list (a single phone number, a list of phone numbers, a list of contacts from the contact list, a preconfigured recipient list, or a mailing list)

f) User waits for responses and reviews it when received

The source mobile device 211 (i.e. the client) would do the rest—formulating question based on audio input (which is called Question preamble). Then source mobile device 211 ships the questionnaire to server 217 with recipient list. Server 217 farms out question to recipients, receives responses and forward result to user on source mobile device 211.

In one embodiment, hosted questionnaire creation component 207 is a hosted server that can be used by the source mobile device 211 or the PC/notebook/laptop 231 to create questionnaires. In a related embodiment, the questionnaire creation component 207 is part of the server 217 and provides questionnaire creation logic useful for the completion of a partially assembled questionnaire sent by the source mobile device 211. For example, if the source mobile device 211 sends a questionnaire with only audio preambles recorded using the source mobile device 211, the questionnaire creation component 207 is used by the server 217 to incorporate a generic question preamble, a generic multiple-choice set, etc. into each question of the partially complete questionnaire. In a different embodiment, the questionnaire creation component 207 is part of the server 217.

In one embodiment, the questionnaire preamble is not created by the user populating the questionnaire. The questionnaire creation component 207 does not add a questionnaire preamble, instead it adds textual questionnaire preamble to each question. Each question comprises a textual question preamble incorporated automatically by the hosted questionnaire creation component 207. Other components of a questionnaire are also selectively incorporated by the questionnaire creation component 207 when they are missing from a questionnaire communicated by the source mobile device 211.

In one embodiment, the boilerplate components added to the questionnaires created using the hosted questionnaire creation component 207 comprises a graphics component, a video component and/or an audio component and a textual component.

When a recipient using the recipient mobile device 227 gets the questionnaire on his mobile device, the questions themselves are provided to the recipient by the server 217, starting with the first one, without the preamble of the questionnaire is it does not exist. Thus, in the beginning of the questionnaire, the recipient would view the first question (or just the multiple-choices for it) and would be able activate an Info menu item to hear the audio preamble for the first question. The recipient selects one of the automatically incorporated multiple-choices presented, such as A, D, G, or J, say, by selecting D (or multiple-choice may be A, B, C or D). In a related embodiment, the choices presented to user are 2, 3, 4, 5 (corresponding to adjacent keys on a typical mobile phone keyboard) and the user selects one of them on the recipient mobile device keyboard, before activating the Next menu item to proceed to the next question, if any.

In one embodiment, the recipient device is a legacy device 227 and not capable of letting a recipient user work through the questionnaires. For such a device, the server 217 sends a voice mail notification to the recipient device 227 and when triggered by the recipient device 227, causes the audio preamble of the questions to be played as voice mail, such as those that employ interactive voice response (IVR) systems (not shown). The user is provided with the option to select from the generic set of multiple choices (1, 2 3 or 4) and the user selections are noted through the IVR component (not shown). Thus, part of the questionnaire, the audio preamble with references to the choices available, is played as part of a voice mail and the recipient's choices are recorded by means of IVR and the collated results are forwarded to the user of the source mobile device 211. Such a solution wherein IVR is used makes it possible to incorporate "legacy" devices and land line devices into the network 205 and have them participate in receiving questionnaires and responding to them. The server 217 thus employs the services of an IVR component to provide questionnaires to recipients on legacy devices (and other devices that do not have an appropriate client software installed) in order to solicit user responses to the questions in the questionnaire. Such responses received via the IVR component are also collated and results are sent to the source mobile device 211.

In one embodiment, the recipient mobile device 227 is a legacy device 227 and not capable of letting a recipient user work through the questionnaires as it does not have a client component. Instead, it has a browser that can be used to browse though the questions of the questionnaire, the questions provided employing web pages hosted by the server 217, employing one or more questions to a web page of the questionnaire.

Figure 3A:
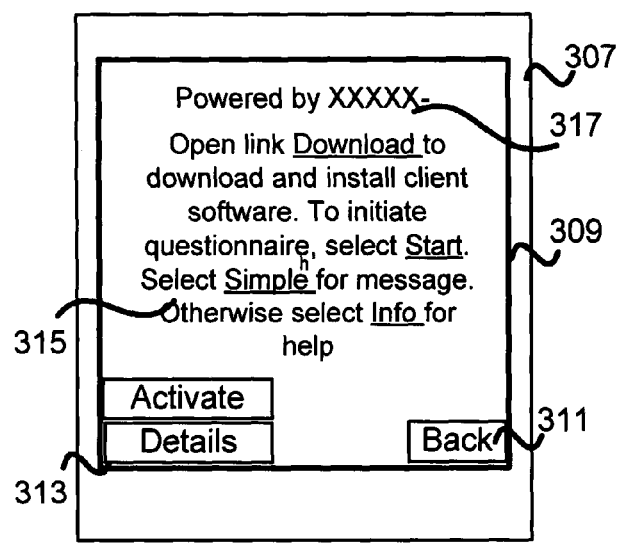
FIG. 3A is an exemplary main splash screen for a mobile device that supports adhoc creation of questionnaires and browsing through a questionnaire from the mobile device.

FIG. 3A is an exemplary notification message display screen 309 for a mobile device 307 that supports the display and/or creation of questionnaires using a client component, or the browsing through a questionnaire from the mobile device 307. Notifications, such as those received as an SMS message, received by user (for example, of type Service message) on mobile device 307, offers the user an opportunity to download a client component that is capable of displaying questionnaires and seeking responses. If the user of the recipient mobile device does not have an appropriate client component (such as a qClient component capable of displaying questionnaires), then the user can still respond to the questionnaire by viewing the questionnaire using a browser in the device, such a browser retrieving one or more web pages for the questionnaire using a link (URL or some such reference) to the questionnaire provided as part of the notification message (such as a URL in an SMS message). Thus, the notification also offers link to questionnaire that a browser can use to provide access to associated web pages for a questionnaire. Notification messages O (such as SMS based ones) can be flagged to be service messages, and are sent to mobile device by service providers supporting/providing questionnaires. They contain links through which the message content, such as questionnaires, can be downloaded.

It is possible to automatically download client component for a questionnaire (such as qClient) and the associated questionnaire to mobile device, if user has configured the mobile device to download messages/content automatically.

Figure 3B:
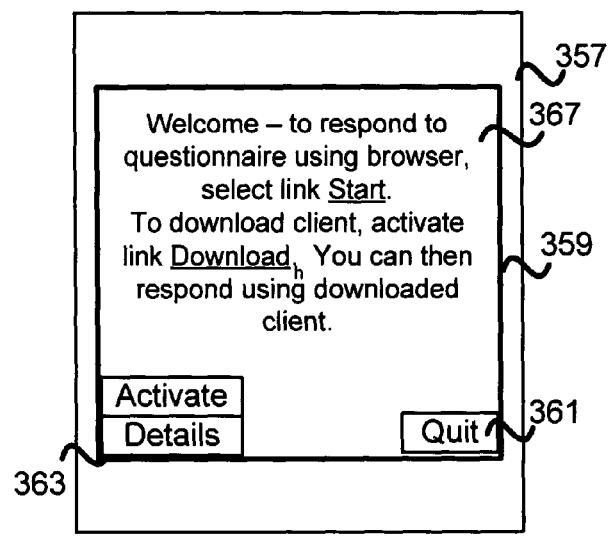
FIG. 3B is an exemplary adhoc questionnaire recording screen that is displayed when the Create menu item is activated from the screen described in FIG. 3A.

FIG. 3B is an exemplary notification message 367 displayed in a notification window (or pane) 359 on a mobile device 357, wherein the user is provided the opportunity to start a questionnaire using a link provided, that a browser can retrieve, and wherein the user is also provided with the links to download the client component if necessary.

A user who receives notification (such as SMS) can open a URL link provided to respond to a questionnaire, using client software such as a browser, interacting with server that is remotely hosted that provides web pages for the questionnaire. Alternatively, the user can download client component (such as qClient) by activating a Download link in the received notification (such as SMS message) and then respond locally using downloaded client (that is then installed too).

Figure 3C:
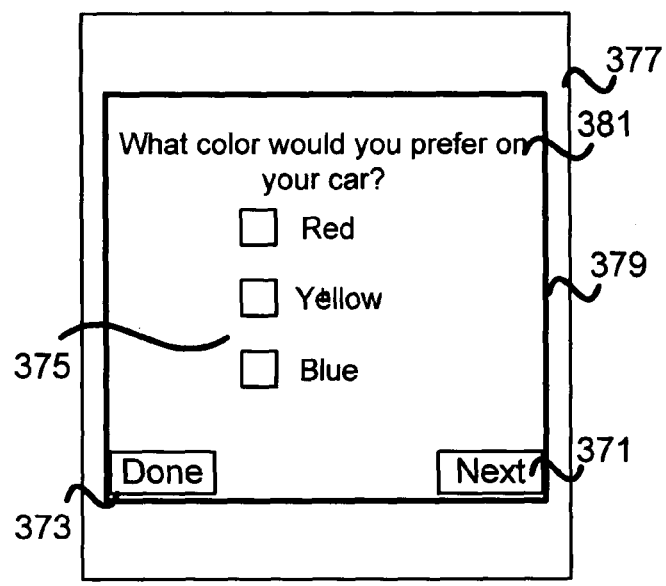
FIG. 3C is an exemplary adhoc questionnaire recording screen that is displayed when the user Stops recording the audio portions, such as an audio preamble, for a given question while creating a questionnaire.

FIG. 3C is an exemplary browser window 379 on a mobile device 377 that is used to retrieve and display questions from a questionnaire that is distributed by a server in a network. For the mobile device 377 with no Qclient installed, a browser in the mobile device 377 can be used by a user to interact with a server that provides questions of a questionnaire. The browser in the mobile device 377 retrieves one question at a time and displays it. Audio component, if any, in each page is played by a media player (or some audio player) in mobile device 377. Similarly video content and graphics content, if any are displayed using appropriate plug-ins to the browser.

Figure 4:
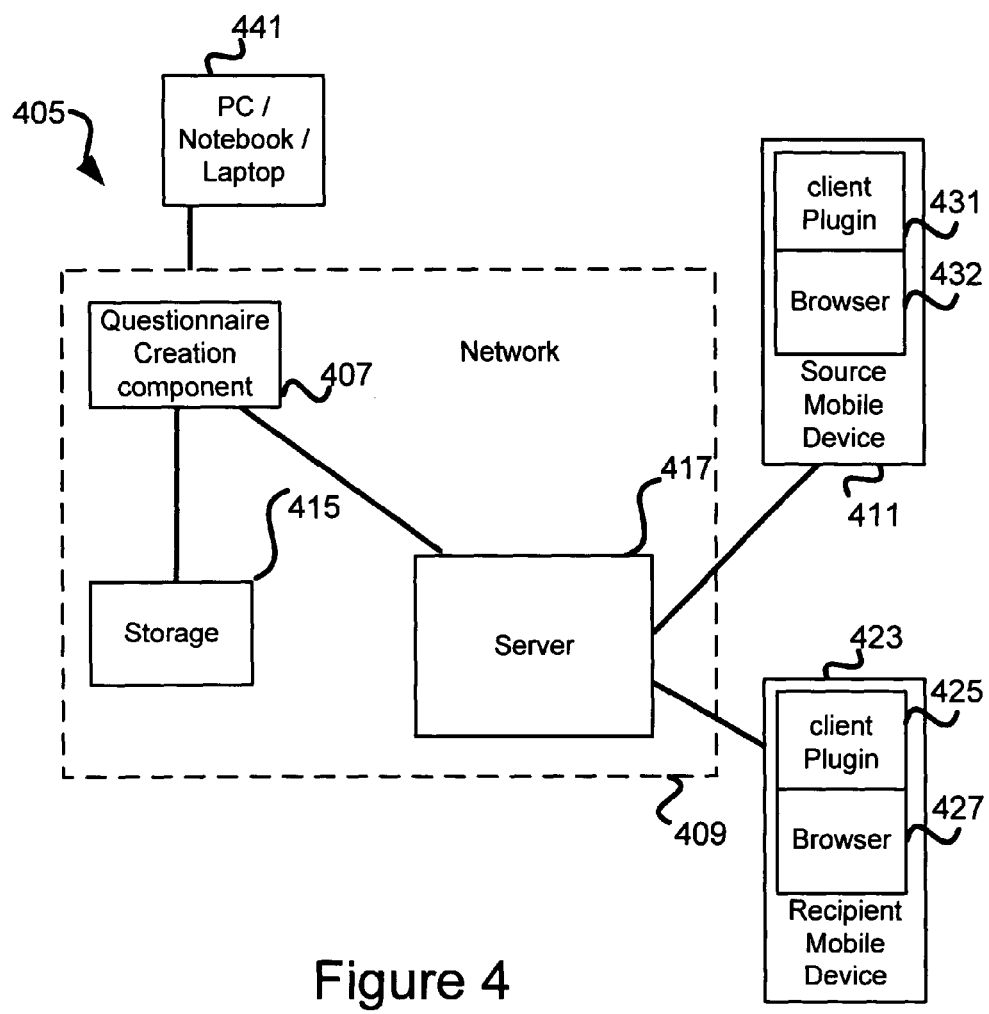
FIG. 4 is a perspective block diagram of a network wherein the source mobile device comprises a client plugin for a browser that makes it possible to create questionnaires in the source mobile device, and wherein the recipient mobile device comprises a client plugin for a browser that makes it possible to browse through questionnaires in the recipient mobile device.

FIG. 4 is a perspective block diagram of a network 405 wherein a source mobile device 411 comprises a client plugin 431 for a browser 432 that makes it possible to create questionnaires in the source mobile device 411, and wherein the recipient mobile device 427 comprises a client plugin 425 for a browser 427 that makes it possible to browse through questionnaires in the recipient mobile device 423. The client plugin 431 in the source mobile device 411 receives incoming questionnaires from the browser and helps the user review them on the browser, answer the questions and provide results back to the server. The browser 432 receives questionnaires from the server 417 and communicates them to the client plugin 431 for processing. Similarly, the client plugin 431 makes it possible for the user of the source mobile device 411 to create new questionnaires using the browser as the conduit. For example, the user of the source mobile device 411 activates a specific web page hosted by the server 417 that provides a dialog box capable of invoking the question preamble recording and question creating functionality provided by the client plugin 431.

The network 405 also comprises a PC/notebook/laptop 441 that comprises a browser capable of being used to create a questionnaire retrieving web pages from a hosted questionnaire creation component 407. They may also comprise a software application (such as a QCreator application) that is capable of creating questionnaires locally and being used to upload the questionnaires securely to the hosted questionnaire creation component 407 or to he server 417.

The use of the recipient mobile device 423 to walk through the questions of a questionnaire is facilitated by the client plugin 425 that works in conjunction with the browser 427. In a related embodiment, the client plugin 425 is capable of being used as a standalone application as well as a plugin for the browser 427.

In one embodiment, the client plugin 431 is incorporated into the browser 432 and the browser 432 is capable of facilitating the creation of questionnaires or portions of a questionnaire in the mobile device 411. Similarly, the client plugin 425 is incorporated into the browser 425 and the browser 425 is capable of facilitating the browsing of questionnaires or portions of a questionnaire by the user of the recipient mobile device 423.

Figure 5:
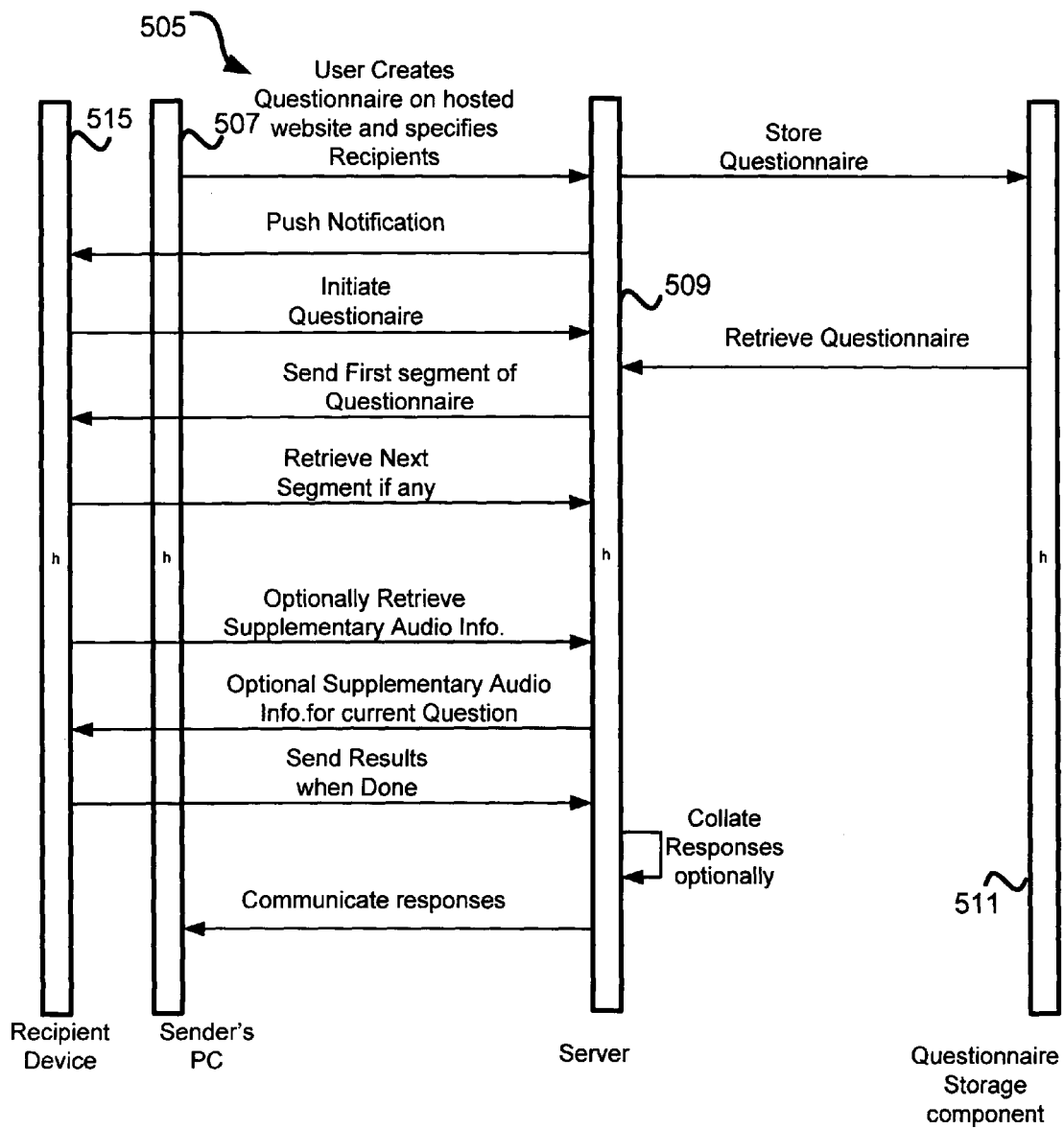
FIG. 5 is an interaction diagram that depicts an exemplary interaction between a source mobile device and a recipient mobile device wherein the source mobile creates an adhoc questionnaire that a server enhances by incorporating generic preambles and multiple-choice portions to the questions in the questionnaires.

FIG. 5 is an interaction diagram that depicts an exemplary interaction between a sender's PC, notebook, PDA or laptop 507 that is used to create and upload questionnaires and a recipient mobile device 515 used to respond to the questionnaire, wherein the sender's PC, notebook, PDA or laptop 507 is used by a user to create an ad-hoc questionnaire with only audio components or a full-fledged questionnaire that a server 509 enhances, if necessary, by incorporating generic preambles and multiple-choice portions to the questions in the questionnaires. In one embodiment, the sender's PC, notebook, PDA or laptop 507 comprise the plugin client that works with browsers to facilitate creation of questionnaires and browsing through any questionnaires received. For adhoc questionnaires with only audio components, the user of the sender's PC, notebook, PDA or laptop 507 initially sends audio portions of questions and a list of recipients to the server 509. The server 509 then forwards the audio portion(s) to a questionnaire creation component 511 to get the questionnaire populated and generic textual content and generic multiple choices (canned choices) inserted for the questions in the questionnaire. The server 509 receives the updated questionnaire from the questionnaire creation component 511 and stores it if needed (temporarily or permanently).

Then, the server 509 sends a push notification to the recipient devices such as recipient mobile device 515. In response, the recipient mobile device 515 initiates the browsing of the questionnaire starting with the first question. The server 509 sends the first segment of the questionnaire, which may comprise of a set of questions, to the recipient mobile device 515. In one embodiment, the browser 427 in the recipient mobile device 515 determines that the client plugin 425 should process the questionnaire and invoke it, passing the questionnaire to it for processing. The client plugin 425 manages the subsequent processing of the questions in the questionnaire.

Figure 6:
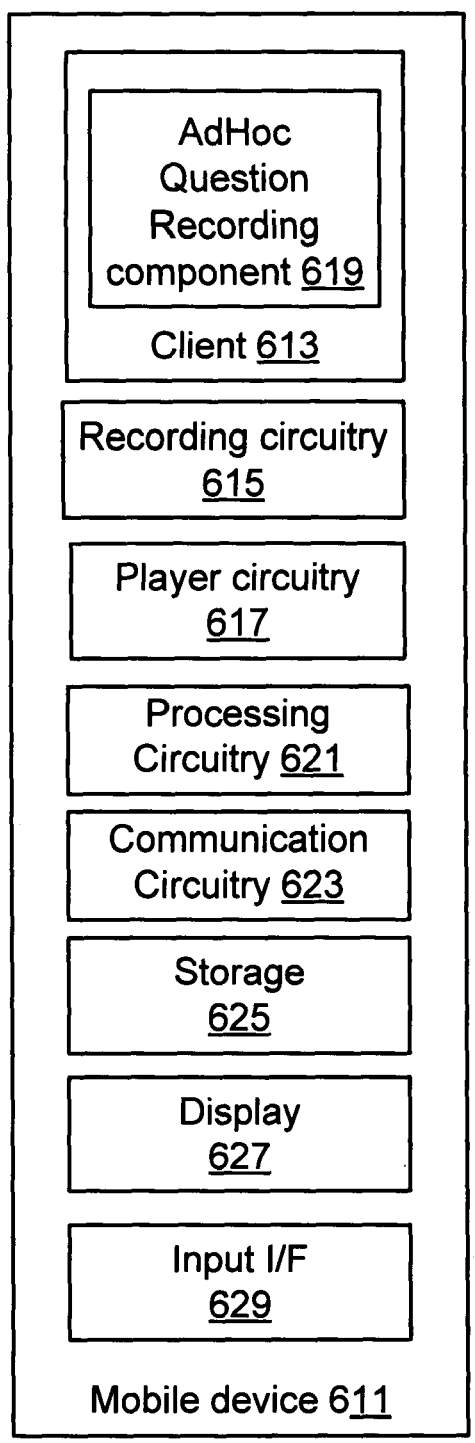
FIG. 6 is a perspective block diagram of a mobile device that is capable of creating questionnaires with audio preambles that are uploaded to a server, the mobile device also being capable of receiving questionnaires and facilitating the perusing of the downloaded questionnaire by a user.

FIG. 6 is a perspective block diagram of a mobile device 611 that is capable of creating questionnaires with audio preambles that are uploaded to a server (not shown here), the mobile device 611 also being capable of receiving questionnaires and facilitating the perusing of the downloaded questionnaire by a user. The mobile device 611 comprises a client component 613 which is a software installed in the mobile device 611. The mobile device further comprises a recording circuitry 615, a player circuitry 617, a processing circuitry 621, a communication circuitry 623, a storage 625, a display 627 and a input interface 629, each of which are communicatively coupled to the client component 613. The client component 613 is adapted to prompt a user operating the mobile device 611 to record the audio preambles of the questionnaires. The client component 613 typically displays a button marked "Record" on the display 627. The user speaks aloud a plurality of sentences that are recorded by the recording circuitry 615. The client component 613 is further adapted to prompt the user to provide a list of intended recipients. The user provides the list of intended recipients by a variety of ways, for example and without limitation, by inputting user-ids of a plurality of users or device-ids of a plurality of devices or email-ids of the plurality of users via the input interface 629, by recording names of the plurality of users via the recording circuitry 615 etc. The client component 613 is adapted to map the user-ids (or device-ids or email-ids) to a plurality of IP (internet protocol) addresses that uniquely identify a plurality of mobile devices (not shown here). In one embodiment of the present invention the client component 613 retrieves the IP addresses corresponding to the user supplied user-ids (or device-ids or email-ids) from a lookup table stored in the storage 625 of the mobile device 611. The client component 613 receives the plurality of recorded sentences from the recording circuitry 615. The plurality of sentences are the audio preambles to the questionnaires. The client component 613 sends the audio preambles and the plurality of IP addresses corresponding to the plurality of mobile devices (the intended recipients) to the server (not shown here) via the communication circuitry 623.

The server, for example and without limitation, appends a textual preamble and a multiple-choice set to each of the audio preambles to generate a questionnaire. The server thus generates the questionnaires and sends the questionnaires to the plurality of mobile devices (the intended recipients). Each of the plurality of mobile devices has a copy of the client component 613 installed in it.

For example, the server sends another questionnaire to the mobile device 611. The client component 613 running on the mobile device 611 after receiving the another questionnaire from the server, sends audio preamble of the another questionnaire to the player circuitry 617. The audio preamble is played by the player circuitry 617. The client component 613 further directs the display 627 to display textual preamble to the another questionnaire (if any) and multiple-choice set on the display 627. The client component 613 running on the mobile device 611 enables the user operating the mobile device 611 to hear and view the another questionnaire on the mobile device 611.

Figure 7:
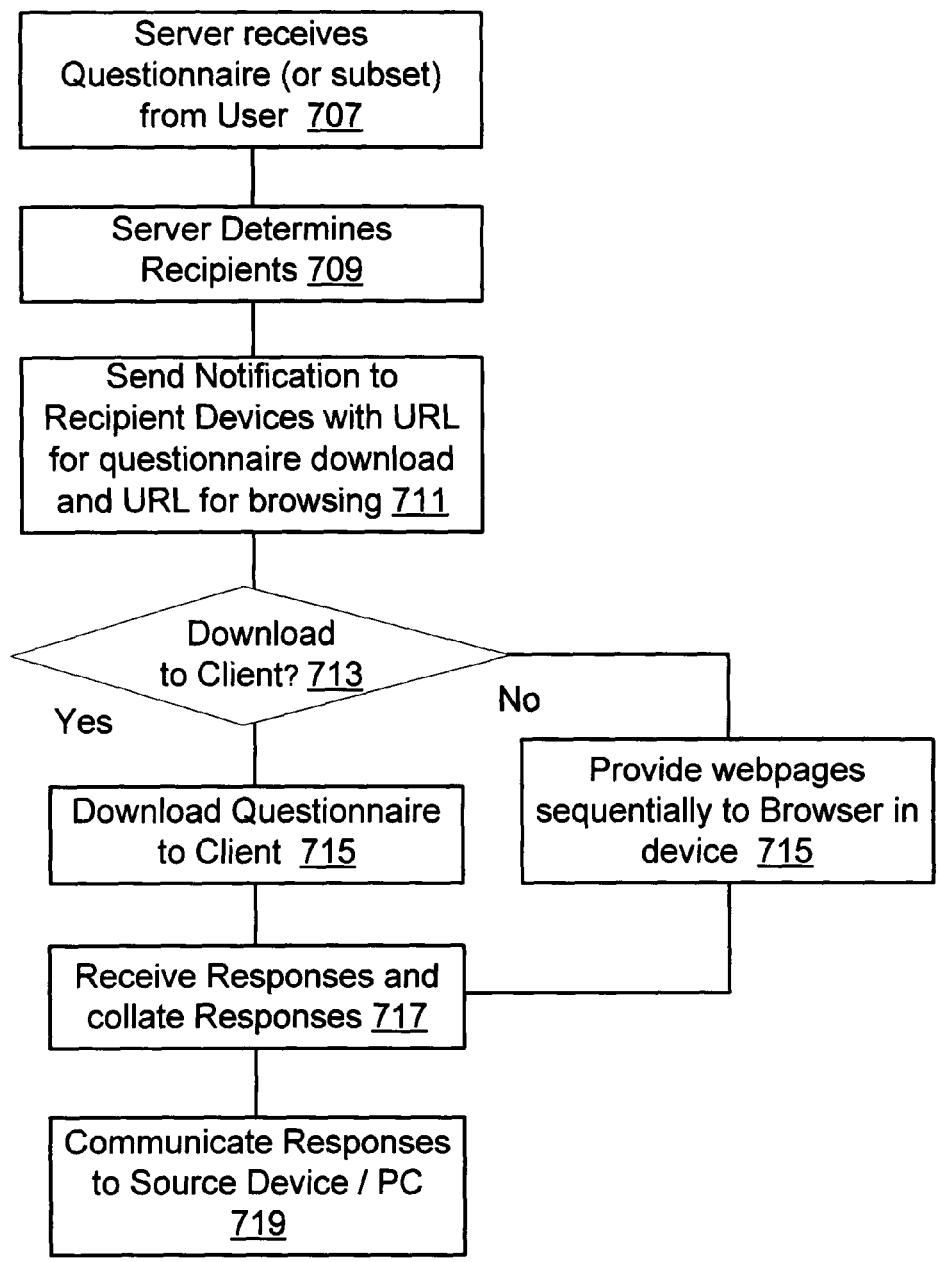
FIG. 7 is a flow chart of an exemplary operation of a server that receives questionnaire from a source device and provides a plurality of options to a recipient device for perusing the questionnaire.

FIG. 7 is a flow chart of an exemplary operation of a server that receives questionnaire from a source device and provides a plurality of options to a recipient device for perusing the questionnaire. The server interacts with the source device using a first protocol and interacts with the recipient device using a second protocol that is, for example and without limitation, communicatively incompatible with the first protocol. The source device and the recipient device is for example, one of a personal computer, notebook, cellular phone, IP phone, PDA etc. The server receives the questionnaire from the source device in a step 707. The questionnaire typically comprises an audio preamble, a textual preamble and a multiple choice set. The audio preamble and/or the textual preamble is a question and the multiple choice set is a plurality of probable answers to the question. The source device comprises a questionnaire creator tool that creates the questionnaire by using input from a user.

The user typically desires to send the questionnaire to a plurality of recipients. The server receives unique network addresses of devices used by the plurality of recipients from the source device. The server is alternately adapted to retrieve the unique network addresses from a database. The server is further adapted to identify the plurality of recipients based on identity of the user and/or based on an event-id attached to the questionnaire, wherein the user provides a priory a list of intended recipients. For example, and without limitation, a first questionnaire from the user corresponds to asking a first group of friends to select a movie from a plurality of movies. The event-id of the first questionnaire is "movie". A second questionnaire that corresponds to asking a second group of friends to select a restaurant from a plurality of restaurants is assigned an event-id "restaurant". The server on receiving the second questionnaire with event-id "restaurant" retrieves network addresses of the second group of friends.

The server after determining the network addresses in a step 709 sends a first uniform resource locator and a second uniform resource locator to each of the second group of friends (or devices used by the second group of friends) using the retrieved network addresses in a next step 711. The first and the second uniform resource locator get displayed on screens of the devices used by the second group of friends. The server allows a first device from the devices to download the second questionnaire if the first device selects the first uniform resource locator in a step 715. The server allows the first device to view the second questionnaire as a collection of web pages in a browser running on the first device if the first device selects the second uniform resource locator as shown in a step 717. The server provides two options to the first device (a recipient device) for perusing the second questionnaire (a questionnaire) that the server receives from the source device.

A user using the first device (any one of the second group of friends) responds to the second questionnaire by selecting an option from the multiple choice set in the second questionnaire. The server waits for responses from each of the second group of friends (the devices used by the second group of friends). In one embodiment the server waits till the server receives all responses. In another embodiment the server waits for a predefined period of time. The server collates a plurality of responses from the second group of friends and sends the plurality of responses to the source device in a step 719.

Figure 8:
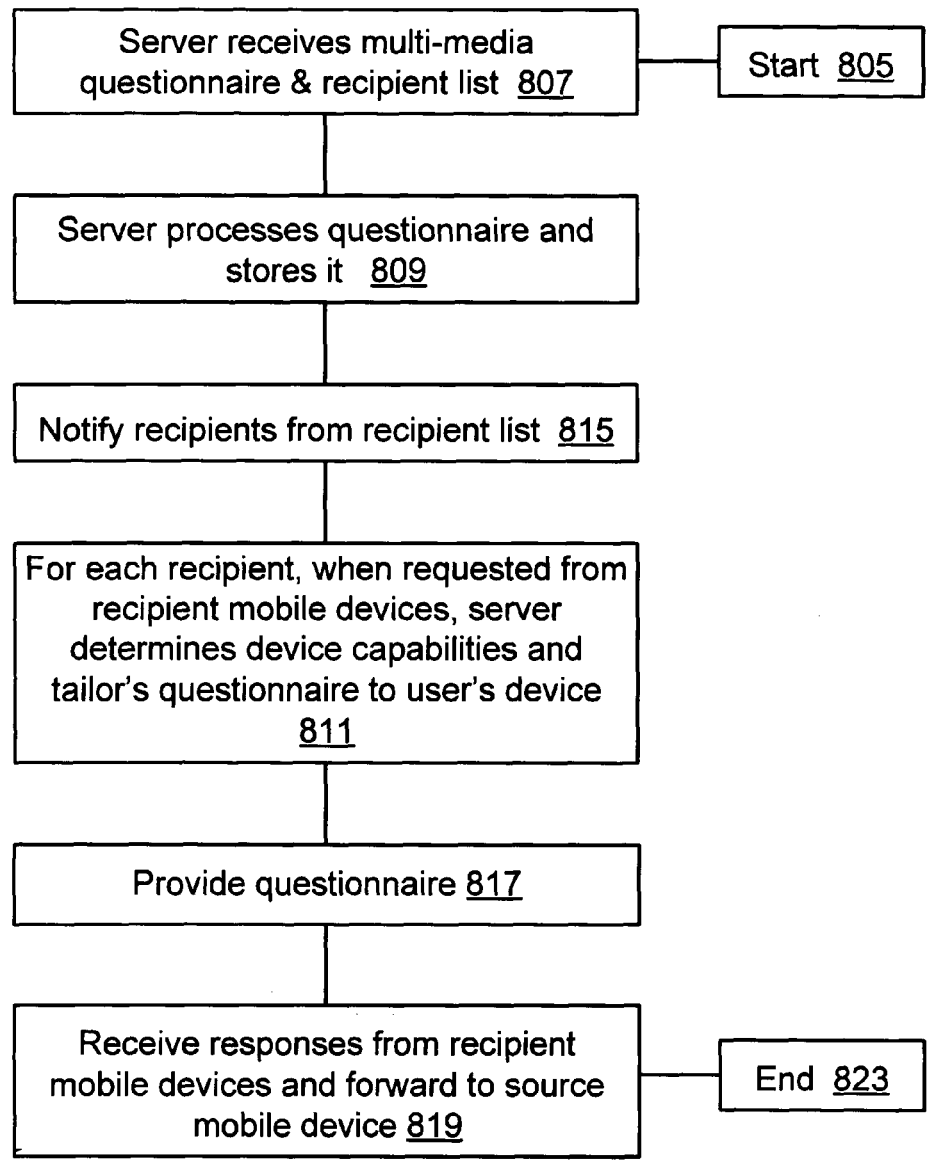
FIG. 8 is a flow chart of an exemplary operation of a server that supports adhoc creation of a questionnaire using a first mobile device and tailoring the questionnaire before sending the questionnaire to a second mobile device.

FIG. 8 is a flow chart of an exemplary operation of a server that supports ad hoc creation of a questionnaire using a first mobile device and tailoring the questionnaire before sending the questionnaire to a second mobile device. The server is communicatively connected to a plurality of mobile devices that are typically a cellular phone, a notebook, a PDA etc. The plurality of mobile devices are associated with a wireless network that is a WLAN network, a cellular network, a WiMAX network etc. The server receives a plurality of questions and a list of recipients from a first of the plurality of mobile devices in a step 807. The plurality of questions are multimedia based i.e., the plurality of questions are one or combination of an audio, video, image and text. The server generates a questionnaire using the plurality of questions in a next step 809 and stores the questionnaire n a storage unit. A typical questionnaire structure is an audio preamble and a textual preamble followed by a multiple choice set for each of the plurality of questions. In one embodiment, the plurality of questions from the first mobile device are audio based. In such a case the server is adapted to append a generic text and a multiple choice set to each of the plurality of questions in the step 809.

The server identifies a plurality of mobile devices based on the list of recipients received from the first mobile device. In a step 815, the server notifies the plurality of recipient mobile devices about the questionnaire by sending short messages to the plurality of recipient mobile devices and waits for responses. On receiving a request for the questionnaire from the second mobile device, the server determines device capability of the second mobile device. The server tailors the questionnaire in pursuance to the device capability of the second mobile device in a step 811. For example and without limitation, the server sends the questionnaire in a web page format if the second mobile device has a browser installed in it. The server is further adapted to remove rich graphics from the questionnaire before sending the questionnaire to the second mobile device if the second mobile device has a low resolution display.

In a next step 817, the server sends the tailored questionnaire to the second mobile device. The server either allows the second mobile device to download the questionnaire to the second mobile device or view the questionnaire as a collection of web pages. In a step 819, the server receives responses to the tailored questionnaire from the second mobile device. The server forwards the responses to the first mobile device.

Figure 9:
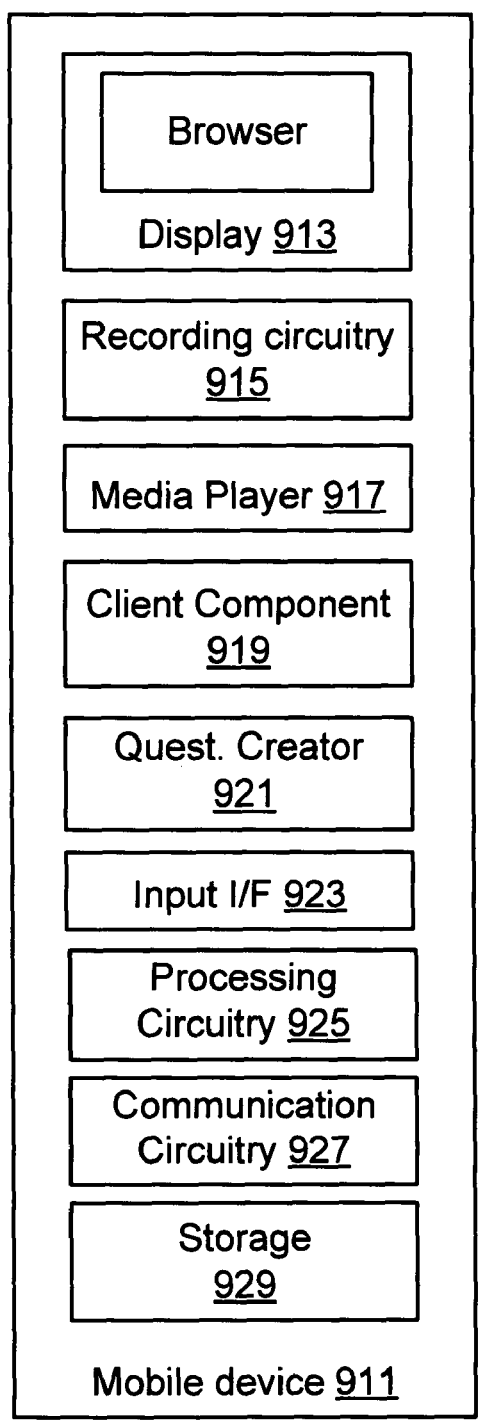
FIG. 9 is a perspective block diagram of a mobile device with a browser and a client plugin that is capable of creating questionnaires with audio preambles that are uploaded to a server, the mobile device also being capable of receiving questionnaires and facilitating the perusing of the questionnaire by a user.

FIG. 9 is a perspective block diagram of a mobile device 911 with a browser and a client plug in that is capable of creating questionnaires with audio preambles that are uploaded to a server, the mobile device also being capable of receiving questionnaires and facilitating the perusing of the questionnaire by a user. The mobile device 911 comprises a display 913, a recording circuitry 915, a media player 917, a client component 919, an input interface 923, a processing circuitry 925, a communication circuitry 927 and a storage 929. The client component 919 is at least a software. The client component is communicatively coupled to the display 913, the recording circuitry 915, the media player 917, the input interface 923, the communication circuitry 927 and the storage 929. A user using the mobile device 911 may typically wish to send a first plurality of questions to a second plurality of users. The client component 919 displays an icon "Create" on the display 913. The client component 919 prompts the user to enter a question preamble and an optional supplementary information for each of the first plurality of questions when the user selects the icon "Create". The question preamble is audio based i.e., the user records the question preamble using the recording circuitry 915. The audio preamble (or question preamble) comprises a question and a plurality of options corresponding to answer to the question. For example, the audio preamble is "Guys, for tonight's movie, choices are A) Jaws, B) King Kong C) Room with a View. Pick one". The client component 919 stores the audio preamble and further stores the optional supplementary information in an XML (extended markup language) format in the storage 919. The client component 919 further prompts the user to enter a list of recipients after receiving the first plurality of questions from the user. The client component 919 displays a contact list stored in the mobile device 911 on the display 913 for the user to choose from. In one embodiment a webpage is set up for the user that is used by the user to pre-register username, a common list of recipients, phone numbers of the recipients etc. The client component 919 is further adapted to retrieve the list of recipients and the phone numbers from the webpage. The client component 919 sends the audio preamble and the optional supplementary information corresponding to each of the first plurality of questions and the retrieved list of intended recipients (the second plurality of users) to a server (not shown here) via the communication circuitry 927.

The server creates a questionnaire for each of the first plurality of questions where the questionnaire comprises the audio preamble and the optional supplementary information provided by the mobile device 911 (or user) followed by a multiple choice set where the multiple choice set is created using user provided information regarding choices in the audio preamble. The multiple choice set in the present example is A) Jaws, B) King Kong, C) Room with a View. The server sends questionnaires corresponding to the first plurality of questions to each of the second plurality of users using the list of intended recipients received from the mobile device 911. The server further receives responses to the questionnaires from the second plurality of users and sends a notification to the client component 919 that the responses are ready. The client component 919 receives the notification from the server as a SMS (shore message service) and displays the short message on the display 913. The server may choose to send the responses as short messages to the mobile device 911 and the client component 919 displays the short messages on the display 913. The client component 919 may be alternately adapted to retrieve the responses from the server in response to the short message based notification from the server.

In an exemplary case another mobile device (not shown here) wishes to send another questionnaire to the mobile device 911. A browser is running on the mobile device 919. The server allows the mobile device 911 to download the another questionnaire or view the another questionnaire as a collection of web pages. The browser and client component 919 enable the user of the mobile device 911 to view the questionnaire as a web page on the display 913 and also to browse the questionnaire. The user inputs his choice from a multiple choice set accompanying the another questionnaire using the input interface 923 that is typically a mouse, keyboard, touch screen, touchpad, a plurality of buttons etc. The client component 919 send the user-choice to the server that forwards the user-choice to the another mobile device.

Figure 10:
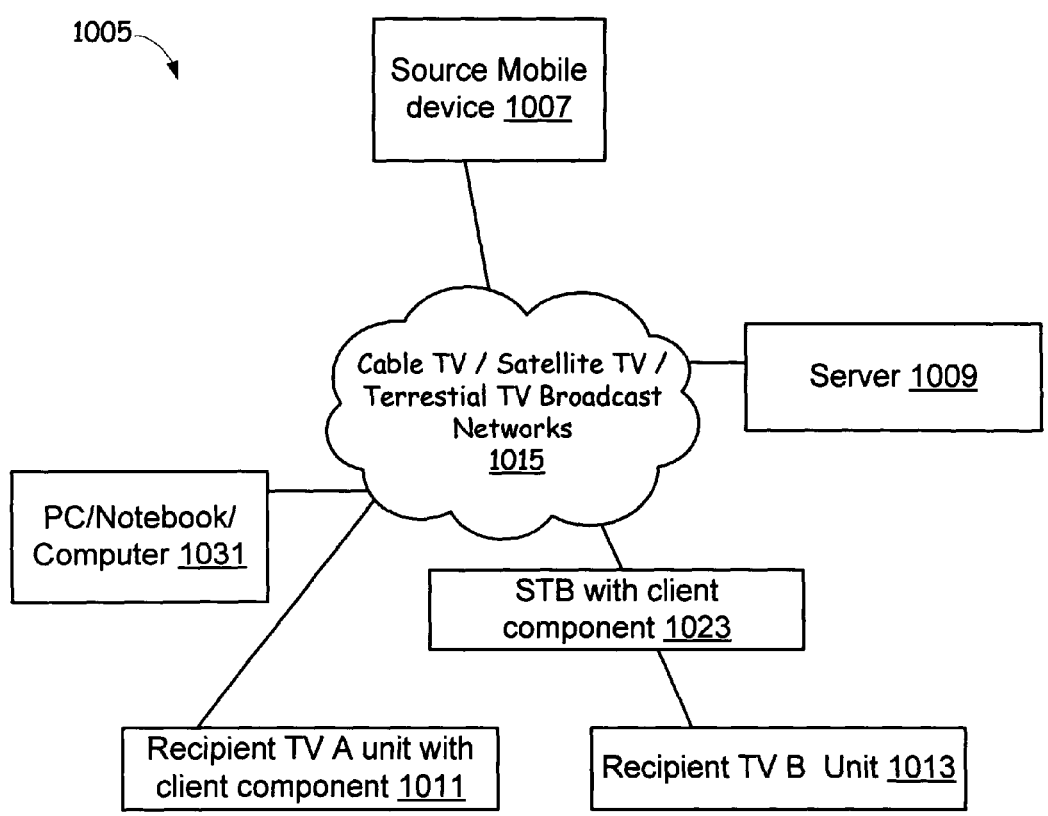
FIG. 10 is a perspective block diagram of a network that facilitates creation and dissemination of questionnaires from a source mobile device to a plurality of televisions.

FIG. 10 is a perspective block diagram of a network that facilitates creation and dissemination of questionnaires from a source mobile device 1007 to a plurality of televisions, 1011 and 1013. The plurality of televisions 1011 and 1013 are associated with a television broadcast network 1015 that is typically a cable TV network or a satellite TV network or a terrestrial TV broadcast network. A first television 1011 has a client component running on it. The client component is a combination of a software and a hardware that allows the first television 1011 to receive questionnaires/questions from the source mobile device 1007 via a server 1009, browse through the questionnaires and upload answers to the questionnaires to the server 1009. The server 1009 is communicatively connected to the television broadcast network 1015 and is enabled to interact with the source mobile device 1007 and the plurality of televisions 1011 and 1013 via the television broadcast network 1015. The plurality of televisions 1011 and 1013 use a first protocol to interact with other network nodes (not shown here) of the television broadcast network 1015. The source mobile device 1007 uses a second protocol communicatively incompatible with the first protocol to interact with the television broadcast network 1015.

The source mobile device 1007 intends to send questionnaires to the first television 1011 and the second television 1013. The source mobile device 1007 receives ad hoc queries from a user using the source mobile device 1007 that is typically a notebook, a cellular handset, a PDA etc. A client software running on the source mobile device 1007 enables the source mobile device 1007 to receive a question and a set of answers corresponding to the question from the user in an audio format. The information from the user is called an audio preamble. The client software (or the source mobile device 1007) creates a questionnaire from the audio preamble an using a personal computer 1031. The personal computer 1031 is communicatively coupled to the television broadcast network 1015. The personal computer 1031 has a software QCreator running on it. The QCreator generates the questionnaire by appending a multiple choice set to the audio preamble wherein the multiple choice set is the set of answers provided by the user. For example the audio preamble is "Where will you like to have my birthday party? a) my house, b) restaurant, c) sea resort." The multiple choice set in this exemplary case is a) my house, b) restaurant, c) sea resort. The client software receives the questionnaire from the QCreator via the television broadcast network 1015 and forwards the questionnaire to the server 1009 via the television broadcast network 1015. The QCreator may be alternately running on the server 1009. In such a case the source mobile device 1007 (or the client software) sends the audio preamble to the server 1009 and the questionnaire is generated by the server 1009.

The source mobile device 1007 sends a list of intended recipient televisions to the server 1009 along with the questionnaire (or the audio preamble). In this exemplary case the first television 1011 and the second television 1013 are the intended recipients. The list comprises network addresses of the first and second television (1011 and 1013) or ids/nicknames corresponding to the televisions 1011 and 1013. The server 1009 retrieves the network addresses from a lookup table stored in a storage unit if the list comprises the ids/nicknames instead of the network addresses. The list is provided by the user to the source mobile device 1007 every time the user provides a question to the source mobile device 1007. In another embodiment the list is created only once. The server 1009 is made aware of the list so that the source mobile device 1007 need not send the list to server 1009 along with the questionnaire (or the audio preamble) every time. The server 1009 is equipped with the questionnaire based on the question and the set of answers from the user and network addresses of the intended recipients. The server 1009 sends the questionnaire to the first television 1011 and the second television 1013.

The first television 1011 has the client software installed on it. The second television 1013 is communicatively coupled to the television broadcast network 1015 via a set top box 1023. The set top box 1023 has the client software installed on it. The client software running on the first television 1011 allows the questionnaire received from the server 1009 to be viewed as a sequence of web pages on a screen of the first television 1011 provided the server 1009 sends the questionnaire to the first television 1011 in a web page format. A first end-point user using the first television 1011 is able to view the questionnaire on the screen and further able to the browse the questionnaire. The first end-point user is further able to download the questionnaire in the web page format and store the questionnaire in the first television 1011. The second television 1013 (or a browser running on the second television 1013) interacts with the set top box 1023 presents the questionnaire as a collection of web pages on a screen of the second television 1013. The second television 1013 interacts with the client software running on the set top box 1023 continuously so that a second end-point user using the second television 1013 be able to browse the questionnaire.

Each of the first end-point user and the second end-point user inputs answer to the question in the questionnaire (i.e., Where will you like to have my birthday party?) by selecting one out of the multiple choice set provided in the questionnaire i.e., one out of a) my house, b) restaurant, and c) sea resort. In one embodiment the questionnaire displays each option of the multiple choice set as a uniform resource locator. The first end-point user (or the second end-point user) inputs his choice by clicking one of uniform resource locators. In another embodiment the questionnaire displays boxes next to choices available in the multiple choice set. The first end-point user (or the second end-point user) inputs his choice by ticking off a box corresponding to his preferred option. The client software running on the first television 1011 and the client software running on the set top box 1023 collect answers to the questionnaire from the first television 1011 and the second television 1013 respectively and send the answers provided by the first end-point user and the second end-point user to the server 1009. The server 1009 forwards the answers to the source mobile device 1007 via the television network 1015.

Figure 11:
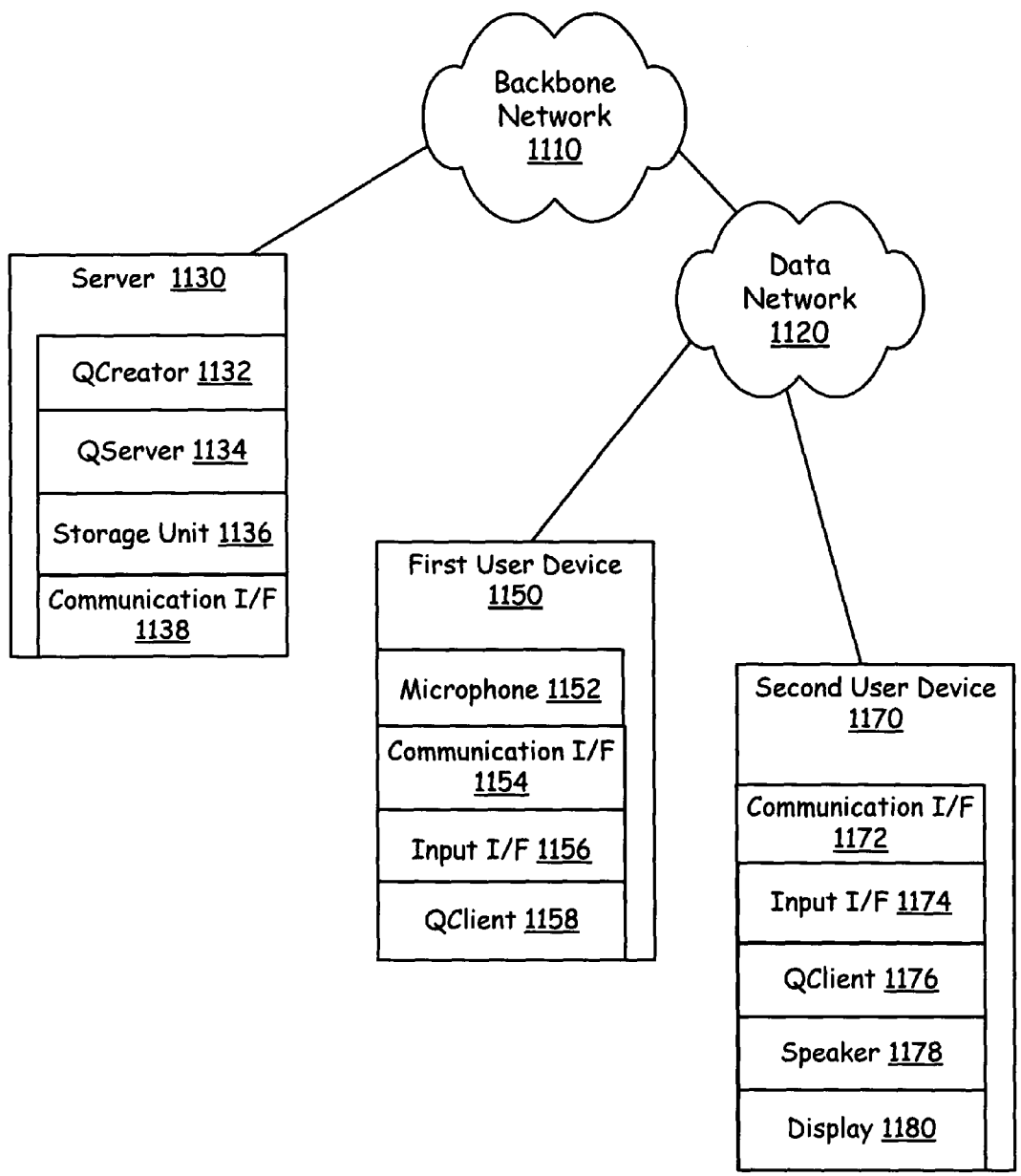
FIG. 11 is a perspective block diagram illustrating interaction between QClient, QCreator and QServer applications where the QClient application is running on a first user device and a second user device and the QCreator application and the QServer application are running on a server to facilitate creation and dissemination of multi-media based questionnaires from the first user device to the second user device.

FIG. 11 is a perspective block diagram illustrating interaction between QClient, QCreator and QServer applications where the QClient application is running on a first user device 1150 and a second user device 1170 and the QCreator application and the QServer application are running on a server 1130 to facilitate creation and dissemination of multi-media based questionnaires from the first user device 1150 to the second user device 1170. The first user device 1150 and the second user device 1170 are associated with a data network 1120. The data network 1120 is one of a variety of, for example and without limitation, a terrestrial cellular network, a wireless local area network, a wireless metropolitan area network etc. that supports audio, video, short message and packet data flow. The first user device 1150 intends to send multi-media based questionnaire to the second user device 1170. The first user device 1150 receives an audio input from a first user. The audio input comprises a question and a plurality of choices corresponding to an answer to the question. The first user records the audio input using a microphone 1152. The QClient application 1158 running on the first user device 1150 sends the audio input to the server 1130 via a communication interface 1154. QServer application 1134 running on the server 1130 that is communicatively connected to the first user device 1150 via a backbone network 1110 receives the audio input via communication interface 1138. The QServer 1134 forwards the audio input to the QCreator application 1132 running on the server 1130. The QCreator 1130 generates a questionnaire based on the audio input. The questionnaire comprises an audio preamble that is an audio file corresponding to the question from the first user and a multiple choice set that comprises the plurality of choices provided by the first user. In another embodiment the questionnaire comprises a textual preamble that comprises detailed information regarding the multiple choice set. The QCreator 1130 is adapted to generate the questionnaire in a web page format. The QServer 1134 determines device capability of the second user device and directs the QCreator 1130 to tailor the questionnaire in pursuance to the device capability of the second user device. For example and without limitation, the QCreator generates a text based questionnaire if a display 1180 of the second user device 1170 is not adapted to display images. The QCreator 1130 sends the tailored questionnaire to the QServer 1134.

The QServer 1134 sends the tailored questionnaire to the second user device 1170 via the backbone network 1110 and the data network 1120 and using the 1138. The QServer 1134 provides two options to QClient 1176 for perusing the questionnaire: (1) download and display the questionnaire on the display 1180 and (2) browse the questionnaire that appears as web pages without downloading. The QClient 1176 running on the second user device 1170 is adapted to download the questionnaire. The QClient 1176 prompts the second user to input his choice of perusing via input interface 1174. The QClient 1176 receives the questionnaire via communication interface 1172 and displays the audio preamble, the multiple choice set and the textual preamble of the questionnaire on the display 1180 if the second user chooses to download the questionnaire from the server 1130. The QClient 1176 requests the QServer 1134 for a first page of the questionnaire in web page format if the second user chooses to browse the questionnaire. The QClient 1176 requests the QServer 1134 for subsequent pages of the questionnaire as the second user browses through the questionnaire. The QClient 1176 receives a single page of the questionnaire per request and displays the received page on the display 1180. The QClient 1176 plays the audio file corresponding to the question from the first user using a speaker 1178 if the second user selects the audio preamble.

The second user informs the QClient 1176 about his choice from the multiple choice set by using the input interface 1174 that is one of a mouse, keyboard, touch screen, plurality of keys etc. The QClient 1176 sends user response to the server 1130. The QServer 1134 running on the server 1130 forwards the user response to the first user device 1150 as a text based message. QClient application 1158 running on the first user device 1150 receives and displays the text based message (i.e., response to the question from the first user) on a display (not shown here) of the first user device 1150.

Figure 12:
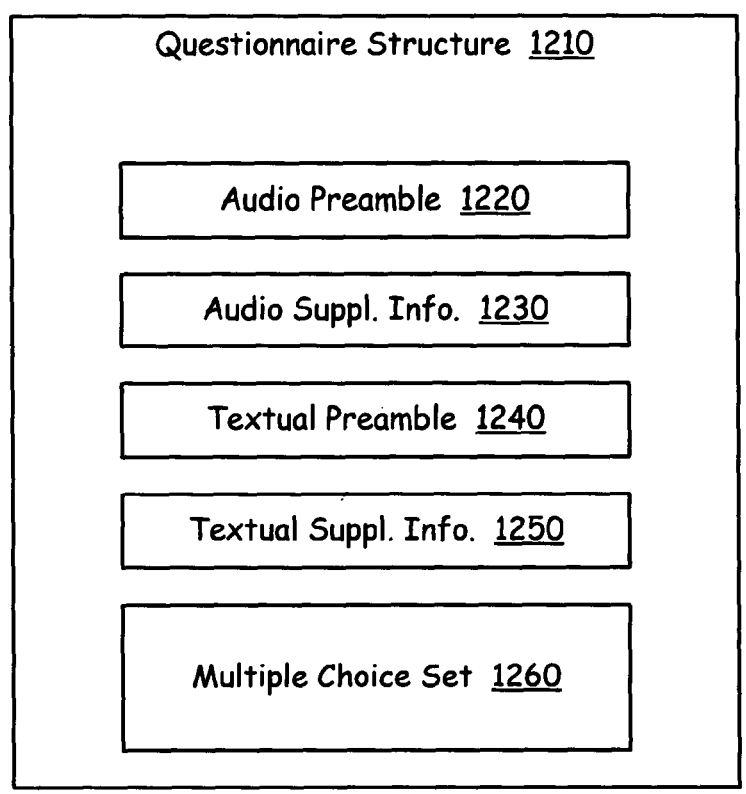
FIG. 12 is an exemplary questionnaire structure that is displayed on a screen of a recipient user device.

FIG. 12 is an exemplary questionnaire structure 1210 that is displayed on a screen of a recipient user device. The questionnaire 1210 comprises an audio preamble 1220, an audio supplementary information 1230, a textual preamble 1240, a textual supplementary information 1250 and a multiple choice set 1260. A source user device receives an audio input from a first user. The audio input typically comprises a question and a plurality of answers to the question. For example and without limitation, the audio input is "Guys, for tonight's movie, choices are A) Jaws, B) King Kong C) Room with a View. Pick one". The source user device sends the audio input to a server that creates a questionnaire using the audio input. The server sends the questionnaire to the recipient user device. The audio preamble 1220 of the questionnaire is an audio file corresponding to a sentence "Guys, for tonight's movie, choices are". A second user who views the questionnaire on a screen of the recipient user device hears the sentence "Guys, for tonight's movie, choices are" when the second user plays the audio preamble 1220 of the questionnaire 1210. The textual preamble 1240 of the questionnaire 1210 is the sentence "Guys, for tonight's movie, choices are" displayed on the screen. The textual preamble 1240 in addition comprises identity of the first user. The audio supplementary information 1230 of the questionnaire 1210 is an audio file corresponding to a phrase "Pick one".

The multiple choice set 1260 of the questionnaire 1210 is a graphic display of a plurality of choices provided by the first user, i.e., A) Jaws, B) King Kong and C) Room with a View on the screen of the recipient user device. The server, in one embodiment, sends a plurality of uniform resource locators, one each for the plurality of choices, to the recipient user device. The second user using the recipient user device responds to the questionnaire by selecting a uniform resource locator in pursuance to his choice from the plurality of uniform resource locators.

The textual supplementary information 1250 comprises information regarding the plurality of choices sent by the first user. In this exemplary case, the textual supplementary information 1250 comprises viewer rating of movies A) Jaws, B) King Kong and C) Room with a View, date of release of the movies, name of directors of the movies, category of the movies etc. The server is provided with the supplementary information by the first user. The server, in another embodiment, is adapted to retrieve the supplementary information from a database based on the audio input from the first user.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A network comprising:
a source mobile device that captures audio input from a user and creates a questionnaire;
a first recipient device that comprises a questionnaire client capable of handling the questionnaire;
a second recipient device that does not comprise the questionnaire client capable of handling the questionnaire;
the second recipient device comprising a website browsing client capable of displaying webpages;
a server, communicatively coupled to the source mobile device, the first recipient device and the second recipient device;
the server receiving the questionnaire and a list of recipients that provides identifications of the first recipient device and the second recipient device, from the source mobile device;
the server mapping the list of recipients into appropriate phone numbers, email addresses and/or IP addresses;
the server adding audio information to the questionnaire provided by the source mobile device to create a prepared questionnaire;

the server sending the prepared questionnaire to the first recipient device for display to a first recipient user;

the server providing one or more questionnaire webpages associated with the questionnaire to the second recipient device for access by a second recipient user; and wherein the server tailors the prepared questionnaire to the capability of the first recipient device when the questionnaire is downloaded and to the second recipient device when the questionnaire is viewed as a collection of webpages.

2. The network of claim 1, wherein at least one of the first recipient device and the second recipient device is a mobile device.

3. The network of claim 2 further comprising:
the server converting the questionnaire provided by the source mobile device into corresponding questionnaire webpages associated with the questionnaire for access using the second recipient device.

4. The network of claim 2 further comprising:
the server adding boilerplate text and audio information to the questionnaire provided by the source mobile device to create a prepared questionnaire; and
the server sending the prepared questionnaire to the first recipient device for display to a first recipient user.

5. The network of claim 4 further comprising:
the server converting the prepared questionnaire into corresponding questionnaire webpages associated with the questionnaire for access using the second recipient device.

6. The network of claim 4 further comprising:
the server determining that the first recipient device comprises the questionnaire client capable of handling the questionnaire and sending the prepared questionnaire to the first recipient device; and
the server determining that the second recipient device does not comprise the questionnaire client and providing access to the questionnaire webpages associated with the questionnaire to the second recipient device.

7. The network of claim 4 further comprising:
the server determining that the second recipient device does not comprise the questionnaire client and providing a notification to the second recipient device regarding the availability of the questionnaire webpages.

8. The network of claim 7 further comprising:
a downloadable questionnaire client;
the server facilitating the download of the downloadable questionnaire client;
the second recipient device capable of downloading and installing the downloadable questionnaire client;
the notification to the second recipient device comprising an URL associated with the questionnaire webpages that can be used to access the questionnaire webpages and a link to downloadable questionnaire client that can be used to download the questionnaire client;
the second recipient device employing the link to the downloadable questionnaire client to download the questionnaire client; and
the second recipient device installing the downloadable questionnaire client to provide access to the prepared questionnaire.

9. The server according to claim 1, wherein the source mobile device transmits the captured audio input to the server, and wherein the server transmits the prepared questionnaire in audio form to at least a third recipient device.

10. A method performed by a server that is communicatively coupled to a source device, the method comprising:

receiving a questionnaire from the source device that captures audio input from a user and creates the questionnaire;

determining a plurality of recipient devices to be the target for the questionnaire, wherein determining comprises accepting, from the source device along with the questionnaire, a list of recipients that identifies the plurality of recipient devices, and comprises mapping the list of recipients into appropriate phone numbers, email addresses, and IP addresses for communicating a notification;

sending a first uniform resource identifier and a second uniform resource identifier to the plurality of recipient devices in the notification;

allowing a recipient device from the plurality of recipient devices to download the questionnaire if a user operating the recipient device selects the first uniform resource identifier;

supporting the recipient device to view the questionnaire as a collection of web pages if the user selects the second uniform resource identifier;

finding a device capability of the recipient device;

tailoring the questionnaire to the device capability of the recipient device when it is downloaded or viewed as a collection of webpages;

receiving a plurality of responses corresponding to the questionnaire from the plurality of recipient devices;

collating the plurality of responses; and forwarding the collated responses to the source device.

11. The method of claim 10, wherein the determining comprises retrieving, by the server, identifications of the plurality of recipient devices from a database.

12. The method of claim 10, wherein the questionnaire comprises a plurality of questions that are multimedia based.

13. A server for managing the interactions between a source mobile device and a plurality of recipient television devices over a television broadcast network, the server comprising:

the server that is communicatively coupled to the source mobile device;

the server receiving a questionnaire from the source mobile device for distribution over the television broadcast network;

the server capable of selectively incorporating text, graphics and audio to the questionnaire to create a modified questionnaire;

the server communicating the modified questionnaire to the plurality of recipient television devices by determining that at least a first television of the plurality of recipient television devices comprises a client component capable of processing the modified questionnaire and capable of facilitating response solicitation, and sending the modified questionnaire to at least the first television;

the server receiving responses from the client component in at least the first television;

the server collating the responses from at least the first television communicating the collated responses to the source mobile device; and wherein the server dispenses a one-time response token to the user of at least the first television out-of-band, provides a control screen soliciting the one-time response token from the user of at least the first television; and accepts responses from at least the first television only after authenticating the one-time response token received from the user of at least the first television.

14. The server according to claim 13 further comprising:
the server receiving a list of recipients from the source mobile device to determine targets for delivery of the modified questionnaire; and
the server targeting those of the plurality of recipient television devices that are specified as recipients in the list of recipients received from the source mobile device for delivery of the modified questionnaire.

15. The server according to claim 13 further comprising:
the server determining that the first television comprises the client component and then sending the modified questionnaire to the first television;
the server determining that a second television from the plurality of recipient television devices interacts with the television network via a set-top-box and sending the modified questionnaire to the set-top-box for access from the second television; and
the server receiving and collating responses from the first television and the set-top-box.

16. The server according to claim 13 further comprising:
the server sending the modified questionnaire to a second television from the plurality of recipient television devices that employs a set-top-box to interact with the television broadcast network; and
the server employing the set-top-box to communicate the modified questionnaire to the first television and to retrieve user responses provided by a user of the first television.

17. The server according to claim 13, wherein the client component enables accessing the modified questionnaire as a plurality of interactive web pages on the first television.

* * * * *